Aug. 22, 1950

G. J. PERLOW ET AL 2,519,395

METHOD AND MEANS FOR HEADING ADJUSTMENT
OF A DEGAUSSING SYSTEM

Filed March 3, 1948

Inventors
G. J. PERLOW
L. H. RUMBAUGH

Attorney

Inventors
G. J. PERLOW
L. H. RUMBAUGH

By M C Hayes

Attorney

Patented Aug. 22, 1950

2,519,395

UNITED STATES PATENT OFFICE 2,519,395

METHOD AND MEANS FOR HEADING ADJUSTMENT OF A DEGAUSSING SYSTEM

Gilbert J. Perlow, Washington, D. C., and Lynn H. Rumbaugh, Indian Head, Md.

Application March 3, 1948, Serial No. 12,846

21 Claims. (Cl. 114—240)

(Granted under the act of March 3, 1883, as amended April 30, 1928; 370 O. G. 757)

This invention relates generally to degaussing of ships and more specifically to methods and means for continually adjusting currents in degaussing coils to compensate for the variation in the magnetic field of the ship due to changes in heading of the ship while the ship's heading is being changed and without the intervention of an operator.

The degaussing of ships heretofore has been somewhat unsatisfactory because of the dependance of the field under the ship upon the instant value of the heading relative to the magnetic north direction. This dependance results from the obliqueness of the lines of earth's field which causes magnetic induction effects in the magnetization of the ship, either longitudinally or transversely of the vessel, or both. These effects depend in a large measure on the effective length of the ship's permeable structure which is disposed in a horizontal north and south direction at any instant. It follows that a considerable variation in the field component under the fore and aft portions of the ship occurs while the heading of the ship is changing.

Previous degaussing methods have attempted to compensate for the aforementioned variations of field by recording the values of ship's field measured at shore stations for each of a number of headings of the ship taken symmetrically about the magnetic north; these recorded fields have been tabulated and estimates of currents required in the compensating coils to compensate for the field at various headings have been calculated for each heading, and operators have adjusted the currents in the degaussing coils, whenever a change in heading took place, in accordance with the calculated current estimates for each heading of the ship.

Such current adjustments are necessarily inaccurate for a number of reasons. Furthermore, such method requires constant attention of two or more of the ship's crew to read headings, to determine the currents required and communicate these to a crew member or operator at the current control panel, who changes the currents accordingly. Such a method of degaussing is inconvenient and uncertain in operation by reason of the human element involved. The time consumed in making a setting also limits the rate of changing the coil currents and hence the maneuverability of the ship if proper degaussing is to be maintained continuously during the maneuvering.

The field of a vessel is normally composed of two parts, the permanent magnetization of the vessel which may originate during fabrication of a vessel, and the induced magnetization which results from the magnetic force of the field of the earth at the position in which the vessel is located. The permanent magnetization of the vessel remains constant over long periods of time and usually does not change materially with changes in latitude or with changes in the heading of the vessel. The induced magnetization of a vessel varies from time to time and changes with changes in cargo, heading, latitude, and sometimes with change in longitude of the vessel. The changes which occur in the field of a vessel due to the vertical component of induced magnetization thereof may be compensated by energized coils encircling the vessel horizontally or encircling a portion thereof.

When only the permanent magnetization of the vessel is considered, the vertical component of field due thereto retains a relatively constant configuration under the various parts of the vessel and requires a constant and predictable neutralizing field configuration for its compensation, which is independent of heading. The induced oblique magnetization, however, produces a magnetization along the length of the vessel and a vertical component under the bow and the stern of the vessel which depend upon the heading of the vessel. For headings between the north and the south heading, the longitudinal magnetization of the vessel due to the oblique lines of force of the earth's field varies according to the cosine of heading.

In the adjustment of the currents in the various degaussing coils employed for the purpose of reducing the field of a vessel to a minimum, a variety of degaussing coils may be employed, which may not be of the same type for various classes of vessels. Vertical magnetization of the vessel, for example, is normally compensated by the use of a coil encircling the vessel at deck level, or slightly above the water line, and may be placed outside the hull, or just within the hull, of the vessel, as desired. This coil is referred to herein as an M coil.

The induced magnetization along the length of the vessel may be compensated with respect to resulting vertical components of field therefrom by a first coil encircling the forward end of the vessel in the same plane as the M coil and energized in a given direction to neutralize the existing vertical component of the field resulting from the longitudinal magnetization, and a second coil about the after portion of the vessel, and in substantially the same plane as the M coil, but energized in an opposite direction to that of the first coil to neutralize the vertical component of the field due to the aforesaid longitudinal magnetization, which is generally opposite in sign to the field to be compensated by the first coil. These two coils are referred to herein as F and Q coils, respectively. These coils are normally of the same area and number of turns such that the two coils may be connected oppositely and in parallel to a source of compensating current. The F and Q coils may be separately energized where different values of currents in the two coils may be advantageously employed.

Another means of compensating for the longitudinal magnetization of the vessel is by employing a single coil substantially encircling the vessel in a plane transverse to the keel of the vessel at about the midsection thereof. This coil is herein termed the L coil. When appropriately energized, the L coil may be regarded as neutralizing the longitudinal component of the field, or preventing longitudinal magnetization of the vessel. The value of current required for the F and Q coils, or L coil, for a north or south heading for any particular value of the magnetic latitude is normally determined by experiment at a magnetic testing range at a shore station. It is apparent that the induced longitudinal magnetization will be greatest in any particular latitude for a north or south heading, and will decrease to zero at east or west headings, varying for intermediate headings according to the cosine of the angle of magnetic heading.

A further coil is sometimes employed in the larger vessels for the purpose of neutralizing the transverse magnetization of the vessel, which effect is maximum when the vessel is on an east or west heading, the variation of magnetization being proportional to the sine of the magnetic heading of the vessel. The coil employed for neutralizing this effect is herein termed the A coil and is normally disposed in a longitudinal vertical plane through the keel of the vessel and substantially encircling the hull of the vessel. Thus a 90 degree phase difference exists between the heading-dependent of the currents employed in the A coil and the L coil, or between the A coil and the F and Q coils, as the case may be. The maximum value of A coil current required for a particular latitude is normally determined at a range station as in the case of the L coil or F and Q coils.

The present invention provides means and method of compensating for the heading-dependent components of the magnetic field of a vessel wherein the control of the current in the field winding of the generator supplying current to each degaussing coil is effected simultaneously with the changes in the heading of the vessel, the field winding being energized in proportion to the appropriate trigonometric function of the angle of heading of the vessel relative to magnetic north. The currents supplied to the degaussing coils are thereby made heading dependent and means is provided for effecting this control efficiently and quickly without the assistance of an operator.

An object of this invention is the provision of means for altering the degaussing currents in accordance with the changes of heading of a ship and concurrently therewith without the intervention of an operator.

Another object is the provision of means for continuously maintaining a voltage proportional to a trigonometric function of the heading of the vessel, and means for controlling the degaussing current in response to the instant magnitude of that voltage.

Another object of the invention is new and improved means for adding variable voltages and for continuously controlling one or more of the variable voltages of a degaussing system sufficiently to maintain the sum of the voltages at approximately zero level and without the intervention of an operator.

A further object is the provision of means for continuously synchronizing changes in heading of a vessel and corresponding changes in the neutralizing field from the degaussing coils.

A still further object of the invention is to provide a method of degaussing the vessel which changes the degaussing currents during changes of heading of the vessel in accordance with the instant requirement of current for optimum degaussing at all times.

Other objects and advantages will be apparent from the description and accompanying drawings in which.

Figure 2:
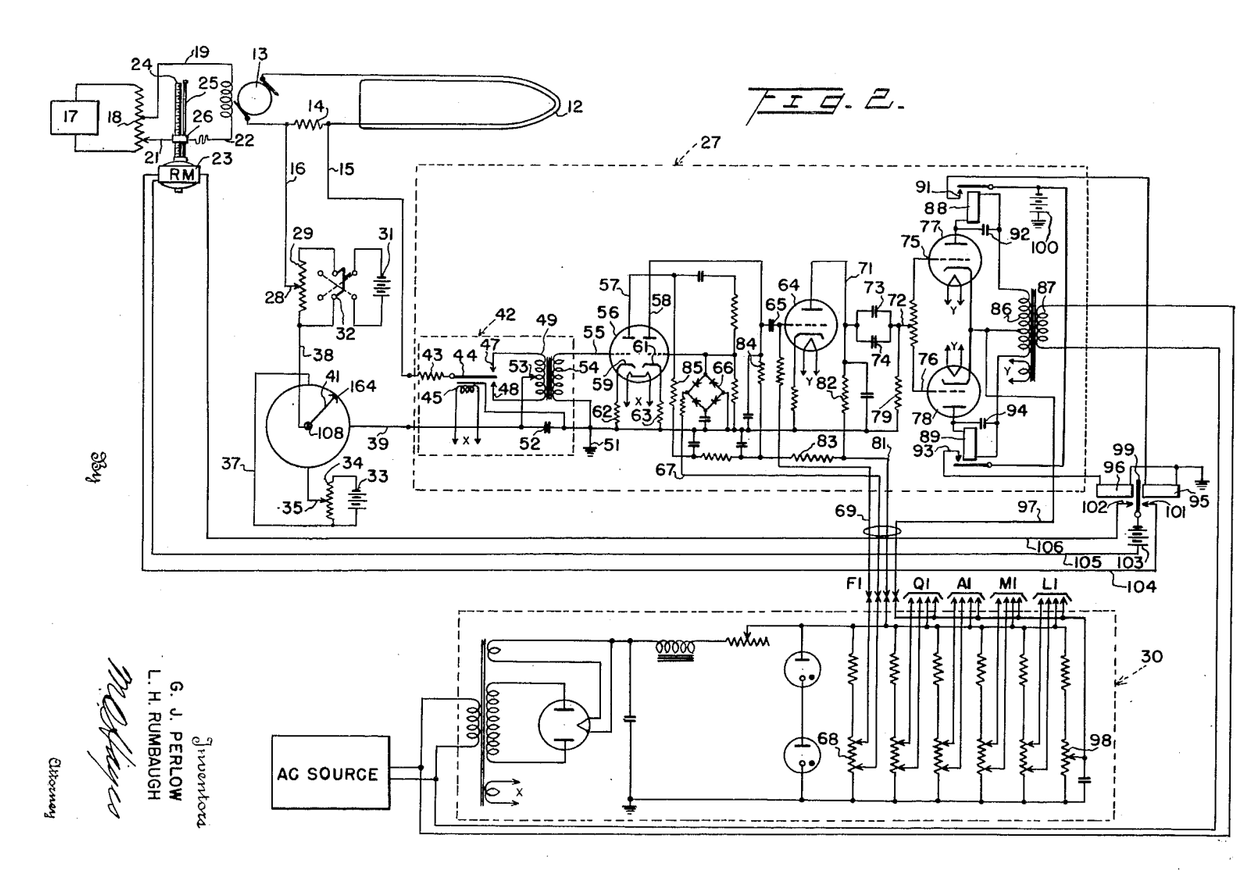
Fig. 2 is a circuit diagram illustrating connections for automatic control of a degaussing coil in accordance with this invention.

This invention will best be understood by reference to the drawings on which like numerals of reference are employed to designate like parts throughout the several views, and more particularly to Fig. 2 thereof on which is shown a battery 33, connected to a potential divider 34 and a cosine- (or sine-) tapered resistance 36, for establishing a first voltage E′, which voltage remains constant for any latitude on a given heading, but varies with the heading of the vessel regardless of latitude. A second voltage E″ is provided by the battery 31 connected to the potential divider 29, which voltage remains constant over long periods of time regardless of heading or latitude. A third voltage, or potential drop E‴, proportional to the instant current employed in a particular degaussing coil is obtained by leads 15 and 16 connected across resistance 14 in series with the degaussing coil 12. These three voltages are connected in series such that E′ plus E″ equals E‴ when each voltage is properly adjusted. A D.-C. amplifier 27 is connected in series with these voltage circuits or sources and responds to the sum thereof, such that the unbalancing of the equation of equality between E‴ and E′ plus E″, in a positive sense, results in the amplification of a positive signal, the closing of an auxiliary power circuit to a D.-C. motor which is connected to adjustingly operate a rheostat in the field winding of the main degaussing current generator 13, the connections being such that the operation of the motor in response to said positive signal varies the field in the generator in a direction to increase the degaussing current and thus restore the potential drop across resistance 14 to equality with the sum of E' plus E''. Conversely, a negative voltage difference between E' plus E'' and E''', when amplified by the amplifier, causes the motor to operate in the opposite direction, thereby adjusting the rheostat in an opposite direction to decrease the degaussing current sufficiently to bring potential drop E''' again into equality with E' plus E'''. In this manner the voltage sum is continually maintained at approximately zero level.

Figure 1:
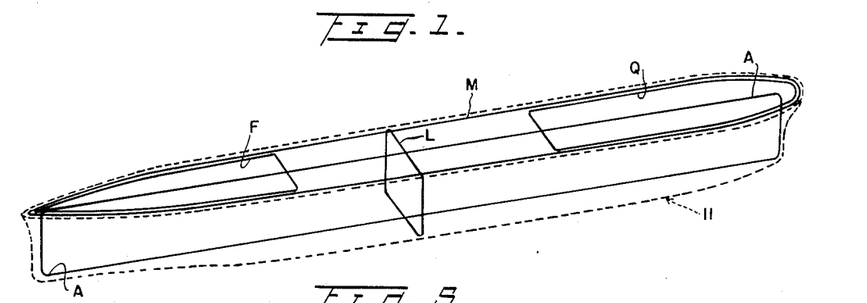
Fig. 1 is a diagrammatic view of a vessel equipped with degaussing coils M, F, Q, A and L.

Referring now to the hull of the vessel is shown in dashed outline and generally indicated by the numeral 11. The M coil is shown encircling the vessel in a horizontal plane near the deck level. The F coil is shown encircling the forward portion of the vessel in substantially the same plane as the M coil and is referred to by the letter F. The Q coil is shown encircling an after portion of the vessel in substantially the same plane as the M coil and is referred to by the letter Q. The M coil, when energized, is adapted to produce a substantially vertical component of field under the entire vessel, the F coil is adapted to boost or subdue, as required, the effect of the M coil under the forward portion of the hull over a length substantially one-third of the length of the vessel, and the Q coil, conversely, is adapted to subdue or boost, as required, the effect of the M coil under the after portion of the hull over a length substantially one-third of the length of the vessel. The relative magnitude of field produced by F and Q coils relative of that produced by the M coil is continually variable from a suitable maximum positive value to a similar negative value. The F and Q coils may be connected in series, but in a reverse polarity, such that when the F coil boosts the field of the M coil under the forward portion of the vessel the Q coil diminishes the effect of the M coil under the after portion of the vessel, as, for example, when a vessel is in a north heading. Fig. 2 illustrates separate control circuits for the F and Q coil heading adjustment.

The L coil is designed to accomplish substantially the same purpose as the combined F and Q coils, the effect of energizing this coil being substantially that of applying a longitudinal field over the length of the vessel to compensate for the magnetization of the vessel along the length thereof due to the longitudinal horizontal component of magnetization arising from the obliqueness of the lines of force comprising the inducing field. The L coil, therefore, may be employed in the place of the F and Q coils or the L coil may be employed in particular instances in addition to the F and Q coils on large vessels or vessels in which a sufficiently high degree of correction is not obtained by either the L coil, or the F and Q coil combination, for the substantial elimination of the longitudinal magnetization of the vessel.

The A coil is disposed in a longitudinal vertical plane and encloses substantially the entire hull of the vessel. When appropriately energized the A coil produces an athwartship field component of sufficient magnitude to neutralize the athwartship induced magnetization component.

In Fig. 2 the numeral 12 indicates a degaussing coil in which the optimum degaussing current is a function of the heading of the vessel. This coil may be the L coil, the F coil, the Q coil, or both the F and Q coils in insulations which require similar changes in F and Q coil currents. The direct current generator 13 produces the current which energizes the coil 12, a separate generator being employed for each automatically controlled coil. The resistance 14 is in series with the generator and the coil, and is employed for the purpose of setting up a voltage E''' proportional to the current in the coil 12, the voltage being tapped off by connections 15 and 16. The output of the generator 13 is controlled by varying the current in the field winding thereof through a suitable range from a positive value to a negative value sufficient to provide adequate current in the coil 12 for any circumstances for use. The field winding is energized from a D.-C. source 17 of fixed polarity and the current therein is varied by adjustment of a rheostat 18 from which a center tap 19 connects to the field winding, and a slide connection 21 connects to the second terminal of the field winding by means of the lead 22 whereby the current is continuously variable from positive to negative values. A reversible direct current motor 23 carries a threaded shaft 24 which rotates therewith. A fixed slide arm 25 is attached to the frame of motor 23 parallel to shaft 24. A collar 26 threadably engages the shaft 24 and slides on the arm 25 so that the rotation of the motor drives the collar longitudinally along the slide arm. The slide connection 21 is secured to a collar 26 in fixed relation thereto such that a voltage from the source 17 across the rheostat 18 is tapped off by the connection 21, and the center tap 19, to impose the tapped off voltage on the field winding in variable polarity and magnitude under control of the instant position of the collar 26 on the arm 25 as determined by previous rotation of the motor 23. Rotation of the motor 23 is controlled in direction and amount by the output of an amplifier referred to generally as 27, as hereinafter more fully disclosed.

A voltage E'' is adjusted by the tap 28 on an energized resistance 29 connected across a D.-C. source such as the battery 31 through the reversing switch 32. The voltage E'' is initially fixedly adjusted proportional to the component of permanent magnetization in the vessel parallel to the axes of coil 12. The permanent magnetization of the vessel does not normally change appreciably during short cruises and is considered for the purpose of this description as fixed. Any significant change in this component of the permanent magnetization imposes the requirement that the position of the tap 28 be manually changed accordingly in order that the voltage E'' be proportional to the component of current in the coil 12 which compensates for the permanent magnetization component along the axis of the coil 12.

A voltage E' is derived from a suitable D.-C. source, such as the battery 33 connected across resistor 34, by means of the tap 35, the tapped off voltage being impressed across the cosine-tapered resistor 36 by tap 35 and lead 37 whereby the voltage E', equal to the voltage tapped off from 33, times the cosine of the instant angle of setting of contactor 41, is imposed on leads 38 and 39. The cosine-tapered resistor is hereinafter more fully described. When the rotating contactor 41 thereof is initially set at zero degrees the voltage introduced into the circuit between leads 38 and 39 from the battery 33 and resistor 34 is unaffected by the cosine-tapered resistor 36 since the entire potential thereacross is employed at the zero degrees setting. The position of the tap 35 is initially adjusted such that E' plus E'' equals the potential drop across resistance 14 when an optimum value of current flows in the coil 12 for a north heading of the vessel. This adjustment of the taps 28 and 35 provides a fixed reference voltage of E' plus E'', for a particular heading such as magnetic north, to which value the potential drop E''' across 14 is to be automatically adjusted by the operation of the motor 23, which operates in response to signals from the amplifier 27 resulting from the instant difference between E''' and E' plus E'' as impressed on the amplifier input. The connections described provide, for example, negative voltages E' and E'' when E''' is positive so that E''' subtracts from E' plus E'' rather than adding thereto, and the amplifier, therefore, sees only the algebraic sum of those voltages. The functioning of motor 23 and generator 13 in response to a voltage sum other than zero thus tends to immediately restore the voltage sum to zero.

The manner of operation of the amplifier and the associated circuit to provide operating currents for the motor 23 will now be described with particular reference to Fig. 2. The voltages employed are relatively small and amplification thereof is desirable for proper functioning of the device. Furthermore it is necessary to distinguish between positive and negative algebraic sums of the voltages E', E'', and E'''. For these reasons, and for others which will be apparent to those skilled in the electronic arts, it is desirable to convert the D.-C. voltage sum to a pulsating or alternating current. This is accomplished by a device commercially referred to as a "chopper" and the amplifier associated therewith is frequently designated a "chopper amplifier."

In Fig. 2 the chopper is indicated generally by the numeral 42 and comprises an input resistor 43 connected to the vibrating element or reed 44 of a vibrating type circuit interrupter. The reed is of ferreous material and is driven in vibration by the electromagnet 45 which is energized at a definite frequency from a suitable source of A.-C. voltage by means of leads X which connect to the same A.-C. source as winding 87 by means of a transformer. The contacts 47 and 48 periodically connect the ends, respectively, of the coil 49 to the reed 44 in alternate order as the reed is actuated by the magnet 45 into contact therewith at the predetermined frequency of vibration of the reed. The lead 39 is connected to ground as at 51 only through the condenser 52, and the reed 44 is connected through resistor 43 to the lead 15 such that there is continually impressed across the lead 39 and the reed 44 the sum of the voltages E', E'', and E'''. A center tap 53 to the coil 49 is connected to the lead 39 and the potential thereof floats with respect to the ground by virtue of the condenser 52 connected between the ground and the lead 39. In this manner either end of coil 49 may be driven to a positive or a negative potential with respect to the center tap thereof, selectively in accordance with the sum of the voltages impressed thereon through leads 15 and 39, as is well known in commercial circuits of this type, such, for example, as in a commercial chopper manufactured by the Brown Instrument Company. A secondary coil 54 composed of a suitable number of turns to produce the desired ratio of voltage, is wound about the coil 53 over a common ferromagnetic core, forming therewith a transformer which is alternately energized in positive and negative directions, through reed 44, contact 47, upper half of winding 49, tap 53, and conductor 39, then through reed 44, contact 48, lower half of winding 49, tap 53 and conductor 39, etc. Thus an A.-C. voltage appears on lead 55 which is connected to the first grid of a double amplifier tube 56. The first triode section of tube 56 has a plate connection 57 capacity coupled to the grid of the second triode thereof. Cathodes 59 and 61 are connected to ground, respectively, through resistors 62 and 63. The two sections of the tube 56 operate independently as amplifiers in cascade arrangement giving two stages of amplification and the output thereof is connected to the grid of triode tube 64 through the condenser 65 to provide a third stage of amplification. Voltage to the plates of tubes 56 and 64 may be supplied in any convenient manner as by the conductor 81 connected to a suitably regulated D.-C. power supply such as 30, through resistances 82, 83, 84, and 85 in any suitable or conventional manner. A bias voltage from potentiometer 68 is supplied to triode 64 as by the lead 69.

It will be noted that the heater filament of the tube 56 has leads X which connect to an A.-C. voltage of suitable value, this voltage being supplied by a step-down transformer winding as at X in the power supply 30. A step-down secondary winding on coil 87 connects by means of leads Y in a conventional manner to the filaments of tubes 64, 77 and 78.

Between the first and second stages of amplification there is interposed a voltage limiting circuit consisting of a small full wave copper-oxide rectifier whose D.-C. terminals are connected to an opposing D.-C. bias voltage. This voltage is supplied in any convenient manner as by lead 67 from potential divider 68 connected to the D.-C. power supply. A rectifier biased in the manner indicated has the property that its resistance measured across the A.-C. terminals is constant and large for small A.-C. voltages, and drops sharply when the A.-C. voltage exceeds that required to overcome the D.-C. bias. The resultant voltage characteristic curve of the amplifier is thus approximately linear, when input voltage is plotted against output voltage, up to approximately the value at which the D.-C. output of the rectifier overcomes the D.-C. bias voltage, at which point the increase in output voltage no longer follows the increase in input voltage, and a flat-topped curve results. This characteristic of the amplifier, resulting from use of the biased rectifier circuit as indicated, is an important safety feature which results in greatly increased reliability, since the output voltage is but slightly affected by the magnitude of the input signal beyond that magnitude which is sufficient to reliably operate the relays connected to the output circuit of the amplifier. Without this limiting feature large and suddenly applied input signals of either positive or negative sign are likely to produce overloading of the amplifier which would result in spurious actuations of both output relays and in unreliability of operation of the motor 23.

The coil 87 is energized from the same source of A.-C. current as the chopper coil 45 and energizes the secondary coil 86, and the plate circuits of tubes 77 and 78 are made conducting during phases of the applied A.-C. voltage corresponding respectively to the making of contacts 47 and 48. The tubes 77 and 78 as connected in Fig. 2 provide phase discrimination and are effective to control the relays associated therewith selectively according to the sign of the voltage input to the chopper amplifier. Since the reed 44 is driven at 60 cycles in synchronism with coil 87 a definite phase relationship exists between the amplified A.-C. voltage wave at grids 75 and 76 and the applied A.-C. wave of plate voltage on tubes 77 and 78. The plate supply from coil 86 to tubes 77 and 78 is in phase with the grid signal to provide tube conduction in one tube if a positive signal is transmitted by way of contact 47 and in the other tube if a negative signal is transmitted by way of contact 48.

The operation of the circuit of Fig. 2, for a positive input signal causes the positive voltage on reed 44 to be impressed upon contact 47 and an A.-C. signal to the grid of tube 56. This signal is amplified in tubes 56 and 64 and is transmitted to grids 75 and 76 of tubes 77 and 78. Since the cathodes are positively biased these tubes are not continuously conducting. The voltage in winding 86 is in proper phase to cause the plate of tube 77 only to be sufficiently energized, in phase with a sufficient grid voltage thereon, to cause conduction in the tube in response to a positive voltage on contact 47. The corresponding positive signal by way of contact 48 is not transmitted to the grid 76 when the plate of tube 78 is sufficiently energized because of the phase difference of 180 degrees between the plate voltages of the tubes 77 and 78. On the other hand a negative input signal or voltage on reed 44 is transmitted via contact 48 and is amplified as an A.-C. signal by tubes 56 and 64 out of synchronism with the positive energization of the plate circuit of tube 77, and in synchronism with positive energization of the plate circuit of tube 78. Tube 78 is thus caused to conduct during the alternate half cycles of the plate voltage when tube 77 is nonconducting. In this manner the chopper amplifier circuit distinguishes between positive and negative signals and this feature of the circuit is employed as hereinafter more clearly appears.

In accordance with the arrangement of Fig. 2, therefore, the conductor 72 has an A.-C. voltage thereon in accordance with the charge on condensers 73 and 74, one of which is variable for final phase adjustment as required. The conductor 72 is resistance coupled to the grids 75 and 76, the grids being normally at ground potential by virtue of the grid leak 79 to ground. The cathodes of tubes 77 and 78 are connected to the center tap of 86 and a positive voltage is transmitted to the plate of 77 during one half of each voltage cycle and to the plate of 78 during the other half of the cycle. Conductor 97 connects the cathodes of tubes 77 and 78 to a D.-C. bias at potentiometer 98 to prevent conduction in the tubes except when the grids thereof are made strongly positive. Associated with each of tubes 77 and 78 in the plate circuits thereof are relay windings 88 and 89.

From the foregoing it will be apparent that a sufficient positive voltage on grid 75 results in current flow in tube 77 and in energization of winding 88 thereby to close contacts 91 during the positive half of each voltage cycle impressed on the plate of tube 77 so long as a positive signal is fed into the chopper. The impedance of the winding 88, and the condenser 92 thereacross, causes the contacts 91 to remain closed continuously until the positive input signal by way of contact 47 is eliminated.

Similarly winding 89 is energized during the alternate half cycles of positive energization of the plate of tube 78 whenever the grid connection 76 is sufficiently positive with respect to the cathode thereof, and the contacts 93 are closed when the negative voltage input by way of contact 48 causes grid 76 to be sufficiently positive during the half cycles when tube 78 can conduct. The impedance in the winding 89 and the associated condenser 94, causes the contacts 93 to remain closed during the interval of negative input voltage. Contact 91 controls the power relay 95 and contact 93 controls the relay 96, each being energized from a D.-C. supply as battery 100. The armature 99 may thus be actuated either by relay 95 or relay 96, which in turn depends upon conduction in tube 77 or 78, to close contacts 101 or 102, which selectively connect the battery 103 and conductor 105 through conductor 104 or 106 to operate the motor 23 in a positive or negative direction in accordance with a positive or negative signal to the amplifier.

In this manner, whenever the voltage E''' exceeds the sum of E' plus E'', a positive voltage signal is amplified and relay winding 95 is energized through contact 91 causing armature 99 to connect with contact 101, energizing motor 23 through conductors 104 and 105. The connections 104 and 105 to motor 23 are such as to drive collar 26 in a direction to decrease the current to the field winding of generator 13 whereby current in coil 12 is reduced until the voltage E''' across resistance 14 comes into equality with E' plus E''. At this time no further voltage signal is fed through the amplifier and tube 77 no longer conducts. This causes the deenergization of the winding 88 and opening of contacts 91 and 101 thereby leaving the motor 23 motionless. The slide connection 21 is thus adjusted to a new position on rheostat 18 and remains thus adjusted until armature 99 is again operated to reoperate the motor. It is noted that the voltage taken from the source 17 by the connections 19 and 21 is continuously variable from positive through zero to negative values, whereby the direction of the current in coil 12 may be changed to compensate change in the sign of the induced field.

The previous description relative to the embodiment of the invention in Fig. 2 shows the operation of the invention for the control of the F coil of a vessel. Suitable connections are shown at the power supply 30 for connecting similar amplifiers for the control of Q, L, A or M coils, as at Q1, L1, A1, and M1. The operation is as previously described for the Q and L coils.

Figure 3:
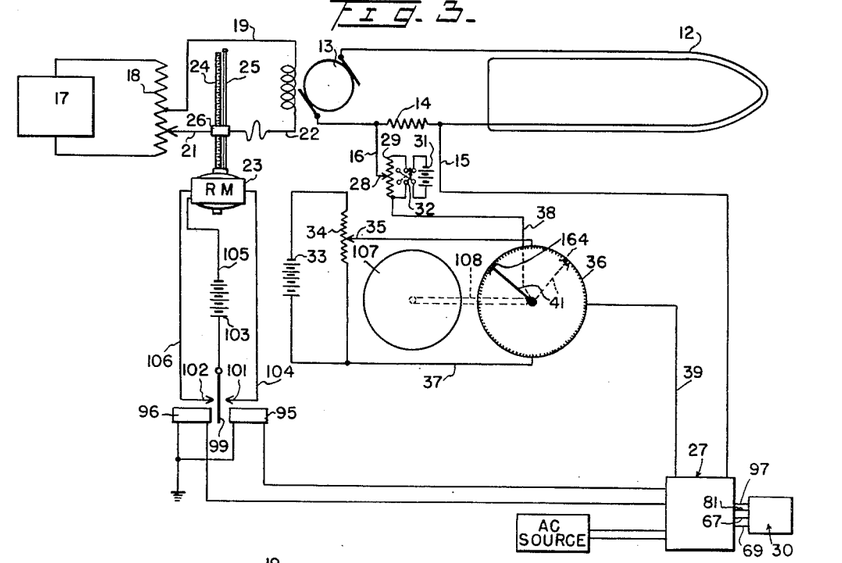
Fig. 3 is a schematic diagram of the circuit of Fig. 2 particularly adapted to control the current in the A coil.
Figure 5:
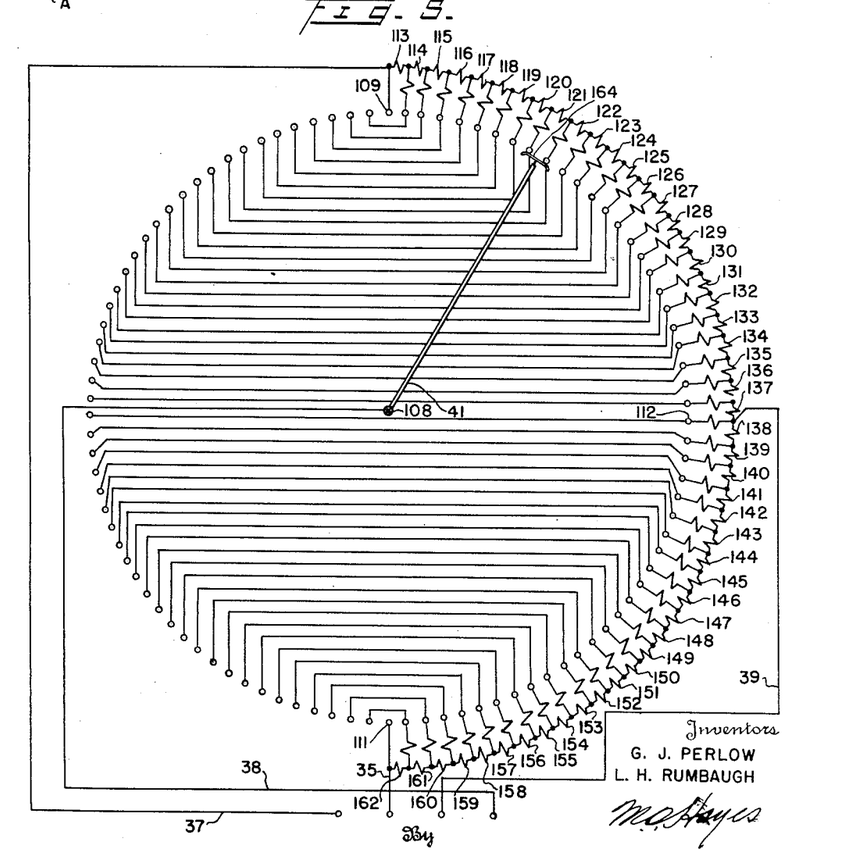
Fig. 5 is a detailed electrical diagram of the cosine-tapered resistor of Fig. 2 and the sine-tapped resistor of Fig. 3.

Fig. 3 shows the invention as previously described except that the cosine-tapered resistance 36 is arranged and adjusted to set up a voltage proportional to the sine of the angle of heading of the vessel. The rotating contactor 41 is shown placed at an orientation differing by 90 degrees from that shown in Fig. 2, also illustrated in Fig. 3 by the dotted position thereof. In Fig. 3 the contactor 41, when properly adjusted, connects conductor 38 directly to conductor 39 when the ship assumes a magnetic north heading. Thus the contactor 41 of Fig. 3 is 90 degrees retarded in phase from the contactor 41 illustrated in Fig. 2. For convenience, therefore, the potentiometer 36 in Fig. 3 may be regarded as a sine-tapered resistor and the voltage E'' introduced into the circuit thereby is in proportion to the sine of a heading of a vessel. In Fig. 3 the dial 107 represents the compass card of a magnetic compass or gyrorepeater. The shaft 108 shown connecting the dial 107 to the contactor 41 at the center of the potentiometer is mounted for rotation with the dial 107. As shown in Fig. 5 the end of shaft 108 may conveniently be of square cross-section closely fitted within the square mounting hole within the end of the contactor 41, to facilitate assembly thereof alternatively as a cosine-tapered or sine-tapered resistance. The contactor 41 thus rotates with dial 107, and when properly adjusted points to the angle of heading of the vessel when heading angles are suitably marked about the periphery of 36, or 90 degrees different therefrom, according to the adjustment for cosine or sine dependency.

In Fig. 5 details of the cosine-tapered resistor are illustrated, in accordance with this invention. When the contactor 41 is in a vertical position as at 109 of Fig. 5 the heading of the vessel would be magnetic north and when in a vertical position as at 111 the heading of the vessel would be magnetic south for cosine dependency. In either of these positions the voltage impressed across leads 38 and 39 is equal to one half of that impressed across 35 and 37, that value being the maximum voltage to be tapped off in accordance with the requirement that this voltage be proportional to the cosine of the angle of heading, the absolute value of the cosine being one at zero degrees and 180 degrees. When the contactor 41 is rotated 90 degrees or 270 degrees from the position 109 the voltage across leads 38 and 39 is zero in accordance with the value of the cosine of 90 degrees and 270 degrees.

Resistances 113, 114 to 137 are connected to contact pins distributed about the periphery of the device at equal angular intervals over an arc of 90 degrees about the center thereof at shaft 108. Similar resistors 138, 139 ... 162 are connected to contact pins distributed at equal angular intervals about a second 90 degrees of arc about the center 108. In this manner the voltage impressed by the leads 35 and 37 is impressed across all of the resistors 113 to 162 in series and the tapped-off portion varies from a maximum value to zero in accordance with the selected trigonometric function. The rotating contactor 41 is provided on the outer end thereof with a contacting brush 164 which is preferably spring mounted within the end of the rotating contactor 41 such that contacting pressure is maintained between the brush and the contact pins such as 109 arranged in a circle around the center of the device. The brush 164 is preferably of sufficient width to bridge adjacent contact pins whereby continuous contact between 164 and one or more of the contact pins is assured. The contact pins are distributed at equal angular intervals about the periphery of the device, the intervals being sufficiently small to provide smooth and accurate control of voltage selected as the arm is rotated. For example, 120 contact pins may be employed, in which case 90 degrees of arc contains 30 pins. A suitable total resistance is then selected and distributed along a 90 degree arc from zero degrees to 90 degrees. According to this arrangement three degrees of arc is the interval between adjacent contact pins.

In the dividing of the potential impressed across the potentiometer according to the cosine of the angle indicated by the arm 41 it is convenient to multiply the total resistance to be distributed within a 90 degree arc by the cosine of successive angles at three degree increments, and to substract this product from the total resistance within the 90 degree arc. The first difference to be so determined is the value of resistance to be connected between the zero degree pin and the first pin, which is the resistance in the 90 degree arc minus the cosine of three degrees multiplied by the total resistance employed in the 90 degree arc. For the resistance element between the zero pin and the six degree pin the cosine of six degrees times the total resistance is computed and subtracted from the total resistance in the arc. Since the total resistance minus the total resistance times the cosine of three degrees has been applied between the zero degree pin and the three degree pin, the resistance to be applied between the three degree pin and the six degree pin is the total resistance of the 90 degree arc times the quantity cosine of three degrees minus cosine of six degrees. This is the value of the resistance of the element to be placed between the second and third pins. In this manner the total resistance is applied by steps between successive pins throughout the 90 degree arc. The resistance employed in the element of arc between any pair of consecutive points $P_a$ and $P_b$ between the zero and 90 degree positions is conveniently expressed as $$R(\cos a - \cos b)$$

where R is the total resistance distributed in the 90 degree arc, $a$ is the angle of $P_a$ and $b$ is the angle of $P_b$ relative to the zero position. The second 90 degree arc is set up in the same fashion as the first 90 degree arc, the value, for example, of resistance between the pins at 177 degrees and at 180 degrees being the same as the value between the zero and three degree pins, the resistance between corresponding pins on either side of the 90 degree position being symmetrical about the 90 degree position.

When the potentiometer is connected in the manner described and a potential is impressed across the zero degree and the 180 degree pins, and the potentiometer is tapped at the 90 degree pin and at the instant position of the rotating contact arm a potential is obtained which varies with the position of the arm and has a value equal to one-half the total voltage times the cosine of the angle of the arm with respect to the zero degree position thereof throughout 180 degrees of rotation thereof. Each pin of the potentiometer taken counterclockwise from the zero degree pin is connected to the corresponding pin taken clockwise from the zero degree pin, such that potentials selected by a counterclockwise rotation of the contact arm are similar, for each position of rotation, to the potential selected by a corresponding clockwise rotation of the contact arm. Thus for each instant position of the contact arm a potential is selected by means of the potentiometer which is proportional to the cosine of the instant angular setting of the arm with respect to the zero degree position thereof. The potentiometer thus connected is herein referred to as a cosine tapered resistor. If the respective positions of leads 35, 37 and 39 are rotated 90 degrees in each instance and the arm left unchanged, the value of the tapped-off component is changed from the cosine of the angle of the setting to the sine of the angle of the setting of the contact arm relative to the original zero position. However, it is convenient in converting the cosine-tapered resistor to a sine-tapered resistor to rotate the contact arm 90 degrees with respect to the control shaft therefor, and to leave the connections fixed as in the cosine-tapered resistor, since the two methods of converting to a sine-tapered resistor are equivalent. It is thus apparent that when a potentiometer constructed according to the preceding description is tapped by means of a rotating arm such as 41 and the potentiometer is fixedly mounted on the vessel carrying the potentiometer while the contact arm points to a position corresponding to the angle of heading of the vessel with respect to the magnetic north, the tapped-off potential varies in proportion to the cosine, or sine, as the case may be, of the magnetic heading of the carrying body.

In order that the response of the cosine-tapered resistor previously described will be more uniform and will change less abruptly as the brush 164 connects or disconnects with successive contact pins, a relatively high resistance is provided between the respective contact pins and the resistance junctions corresponding respectively thereto. This is conveniently done as illustrated in Fig. 5 by placing the resistance junctions outside the periphery of the circular assembly of contact pins such as 169. A resistance, for example, of 1000 ohms, is then connected between the three degree pin and the junction between the first and second resistances assembled to form the potentiometer. Likewise a similar resistance is placed between the six degree pin and the junction of the second and third resistances placed in series to form the potentiometer, etc., thus segregating the contact pins from the resistance junction except at the zero degree and the 180 degree pins. The resistance between the respective contact pins and a corresponding resistance junction is conveniently selected at a value considerably less than the total resistance employed in the potentiometer but much larger than the resistance between the consecutive contact pins. In this manner when two contacts are engaged by the brush a potential is tapped off which is midway between that tapped off by contact of the brush with either of the two pins separately. This arrangement effectively doubles the number of steps in voltage employed and reduces the magnitude of the voltage steps by one-half. Since very little current is caused to flow through the contact arm to a voltage amplifier, the potential on brush 164 changes smoothly and with slight delay from one tapped-off potential to another as the arm rotates.

Figure 4:
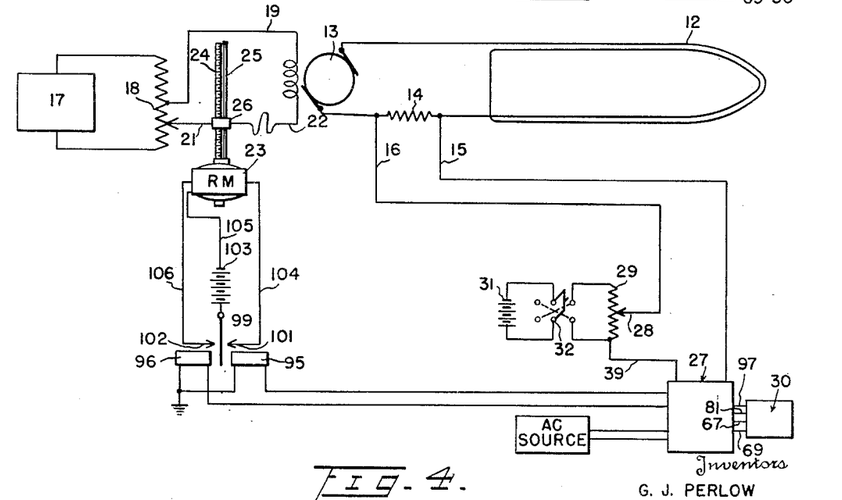
Fig. 4 is a schematic diagram of the circuit of Fig. 2 particularly adapted to control the current in the M coil.

In Fig. 4 is shown a degaussing installation such as hereinbefore described except that the potential derived from the cosine-tapered resistor is omitted and the potential E''' is made equal to potential E'' for the condition of a proper degaussing. When E'' is thus properly adjusted, it remains fixed until manually readjusted and serves as a standard potential to which the potential across resistor 14 is continually adjusted by the automatic operation of amplifier, relay, motor and field winding circuits. In this fashion the current in the coil 12 is continually stabilized to a fixed value regardless of small changes in the driving speed of the generator 13 or in the voltage of power source 17 which energizes the field windings of the generator. This type of installation is suitable for use for stabilizing the M coil current in a degaussing installation since the current thereof should be independent of heading or other short time variations.

It will be noted that the inherent automatic stabilization of the current in the coil 12 is a feature common to the embodiments of the invention employing the cosine-tapered resistance as well as for use with the M coil which is independent of heading. A means is thus provided for controlling large values of current such, for example, as several hundred amperes, and stabilizing that current to a fixed value within close limits, or of varying that current in accordance with any varying condition, such as change of heading, which may be represented by a varying potential E', which may be introduced in series with E'' and E'''.

Whereas the invention has been described with particular reference to one example thereof which gives satisfactory results, it will be understood by those skilled in the art to which the invention pertains, after understanding the invention, that various modifications and changes of form or structure may be made without departing from the spirit or scope of the invention, and it is intended, therefore, in the appended claims to include all such modifications and changes.

The invention described and claimed herein may be manufactured and used by or for the Government of the United States of America for governmental purposes without the payment of any royalties thereon or therefor.

What is claimed as new and desired to be secured by Letters Patent of the United States is:

1. In a degaussing system of the character disclosed for neutralizing the magnetic field of a vessel, a neutralizing coil encircling a portion of the vessel for compensating a heading dependent component of said magnetic field, a source of variable current connected to energize said coil, means for tapping off a first voltage proportional to the instant value of said current, a second source of voltage connected in series opposition with the first named voltage, a gyrorepeater compass device arranged to indicate heading of the vessel, a third source of voltage connected in series aiding to said second source of voltage, said third voltage source including a cosine-tapered resistor connected across a source of reference potential and having a movable contact element operated by said compass device and synchronously therewith to cause said third voltage to vary in proportion to the cosine of the instant heading of the vessel, means for adding said three voltages and amplifying the algebraic sum thereof, and means responsive to the amplified voltage for controlling the current in the neutralizing coil sufficiently to render the first said voltage substantially equal to the algebraic sum of said second and third voltages, whereby the current in said coil is continuously adjusted to a value proportional to the cosine of the instant heading of the vessel.

2. In a degaussing system of the character disclosed for neutralizing the magnetic field of a vessel having a gyrorepeater controlled by a gyrocompass therein, a neutralizing coil for compensating a heading dependent portion of the magnetic field of the vessel and arranged to encircle a portion of the vessel, a direct current generator connected in circuit with said coil, means for supplying a current to the field winding of said generator, means including a resistance in said circuit for providing a variable voltage proportional to the instant current in the coil, means including a cosine-tapered resistance energized by a current of fixed potential and having a movable contact element operated by said gyrorepeater and synchronously therewith for providing a voltage proportional to a trigonometric function of the angle of magnetic heading of the vessel, means including a direct current amplifier connected to both of said voltage providing means for subtracting said voltages and amplifying the difference thereof respectively, means responsive to said amplified voltage difference for controlling the sign and magnitude of said current supplied to said field winding, whereby said coil is energized selectively and variably in accordance with the instant angle of heading of the vessel.

3. In a degaussing system of the character disclosed for neutralizing the magnetic field of a vessel, a neutralizing coil encircling a portion of the vessel for compensating a heading dependent component of said magnetic field, a source of variable current connected to energize said coil, a resistance element in series with the coil and provided with terminals arranged for tapping off therefrom a first voltage proportional to the instant current in the coil, a gyrorepeater compass device arranged to indicate heading of the vessel, a second source of voltage connected to said terminals in series opposition to first said voltage, said second voltage source including a cosine-tapered resistor connected across a battery and mechanically coupled to the compass device and adjustable thereby to cause said second voltage to vary in proportion to the cosine of the instant heading of the vessel, means for adding said voltages and amplifying the sum thereof, means responsive to the amplified voltage for controlling the current in the coil sufficiently to render the first said voltage substantially equal to the second said voltage, whereby the current in said neutralizing coil is controlled according to the instant heading of the vessel.

4. In a degaussing system of the character disclosed for neutralizing the magnetic field of a vessel, a neutralizing coil encircling a portion of the vessel for compensating a component of said magnetic field, a source of variable current connected to energize said coil, a fixed resistance in series with the coil and provided with terminals arranged for tapping off therefrom a first voltage proportional to the instant current in the coil, a second source of voltage manually settable to a predetermined value and connected to said terminals in series opposition with the voltage thereacross, means for adding said voltages and amplifying the sum thereof, means responsive to the amplified voltage for controlling the current in the coil sufficiently in direction and amount to render the first said voltage substantially equal to said opposing voltage, whereby the current in said neutralizing coil is continually stabilized at a predetermined value.

5. The combination of claim 4 having a third source of voltage connected in series with said second source of voltage and in opposition to first said source of voltage, said third source of voltage including means for varying the voltage thereof in proportion to a selected trigonometric function of the instant angle of heading of said vessel, whereby the current in said neutralizing coil is continually adjusted and stabilized at a value proportional to the sum of said second and third voltages.

6. In a system for controlling the degaussing of a vessel for various headings thereof, a device for providing a voltage proportional to the cosine of the angle of the heading, comprising in combination, a supporting structure for said device, a rotatable central shaft arranged within said support, a plurality of contact pins mounted on the support and arranged at equal angular intervals in a circle concentric with said shaft, a contact arm mounted for rotation with said shaft and fitted at the outer end thereof with a contacting brush arranged to make contact with each of said pins as the arm rotates, an array comprising a plurality of graduated series connected resistance elements each arranged with electrical connections, respectively, to a successive pair of contact pins within 180 degrees of arc of said circle and arranged with the values of resistance of said elements progressively selected to provide tapped-off voltages proportional to the cosine of the angle of the instant angular setting of said contact arm when a predetermined voltage is impressed across opposite ends of said array, means for applying said predetermined voltage across opposite ends of the array and at opposedly arranged contact pins respectively connected thereto, means including a pair of electrical connections respectively connected to said arm and to the midpoint of said array for tapping off a voltage proportional to said trigonometric function of the instant angle of setting of the arm, and means for maintaining said shaft at an angular setting thereof corresponding to the instant angle of heading of the vessel.

7. The combination of claim 6 in which the resistance elements are arranged in pairs and each pair of resistance elements is connected to a contact pin through a resistance of value less than the sum of the resistances of the resistance elements comprising said array and of value greater than the resistance of any single element thereof.

8. The combination of claim 7 in which one of the pins is a zero degree pin and the resistance elements in said array are respectively connected to pins comprising a first 180 degrees of arc of said circle, and each contact pin of said arc is connected to a corresponding contact pin symmetrically arranged relative to said zero degree pin in the remaining 180 degrees of arc of the circle.

9. The combination of claim 8 in which the resistance elements arranged in said array have increasing relative values in a first 90 degrees of arc of said circle relative to said zero degree pin, decreasing relative values in a second 90 degrees of said circle, increasing relative values in a third 90 degrees of said circle and decreasing relative values in the final 90 degrees of said circle, the values of resistance in each segment of the circle in positive quadrants thereof relative to the zero pin being the same as the values of resistance in the corresponding segment in negative quadrants of the circle.

10. In a degaussing system of the character disclosed for neutralizing the heading dependent component of the magnetic field of the vessel, a coil encircling a portion of the vessel and arranged for energization sufficient to neutralize said component, direct current generator means for variably energizing said coil, a field winding in said generator for controlling the current therefrom variably in direction and amount to neutralize said component, a fixed voltage source for energizing said winding, an adjustable potentiometer in the circuit of said winding and said voltage source arranged for controlling the direction and amount of the current in said field winding, reversible direct current motor means mechanically connected and arranged for adjusting said potentiometer in either direction continuously while the motor operates, relay means for controlling the direction and amount of operation of said motor means, means connected to the coil for establishing a tapped-off voltage therefrom corresponding to the direction and magnitude of the instant current therein, a second voltage means connected in series opposing to first said voltage means, means for providing a third voltage proportional to a trigonometric function of the angle of heading of the vessel and connected additively to said second voltage means, voltage adding and amplifying means operatively connected to said three voltage means for amplifying a signal corresponding to an algebraic sum of the three voltages, and means responsive to said amplified signal for operating said relay means selectively in accordance with the sign of said sum, whereby said motor means operates to reduce the voltage sum substantially to zero whenever a predetermined minimum voltage sum occurs.

11. The method of compensating a heading dependent component of the induced magnetic field of a vessel by variably energizing a degaussing coil on the vessel, which comprises, measuring the angle of heading of the vessel relative to the magnetic north, establishing a voltage proportional to the cosine of said angle, establishing a second voltage which varies in proportion to changes in the current employed in the degaussing coil, measuring the difference between said voltages, amplifying said difference of voltage, employing said amplified voltage for continuously adjusting the current in said degaussing coil until said second voltage is substantially equal to first said voltage.

12. The method of compensating a heading dependent component of the induced magnetic field of a vessel by variably energizing a degaussing coil on the vessel, which comprises, measuring the angle of heading of the vessel relative to the magnetic north, establishing a voltage proportional to the sine of said angle, establishing a second voltage which varies in proportion to changes in the current employed in the degaussing coil, measuring the difference between said voltages, amplifying said difference of voltage, employing said amplified voltage for continuously adjusting the current in said degaussing coil until said second voltage is substantially equal to first said voltage.

13. The method of degaussing a vessel equipped with M and A coils comprising the steps of energizing the M coil with a stabilized current sufficient to neutralize the steady induced vertical component of field, energizing the A coil with a stabilized current sufficient to neutralize the longitudinal magnetization of said vessel on a north heading thereof, tapping off a voltage from said A coil proportional to the current therein, opposing said voltage with a second voltage continually adjusted in magnitude proportional to the sine of the instant angle of heading of the vessel, and employing instantaneous differences between said voltages for varying the current in said A coil in proportion to changes in the sine of said angle.

14. The method of compensating a heading dependent component of the induced magnetic field of a vessel by variably energizing a degaussing coil on the vessel which comprises, measuring the angle of heading of the vessel relative to the magnetic north, establishing a voltage proportional to the sine of said angle, establishing a second voltage of fixed magnitude and polarity, establishing a third voltage which varies in proportion to the instant current employed in the degaussing coil, measuring the difference between the algebraic sum of the first and second named voltages and the third voltage, amplifying said difference of voltage, and employing said amplified voltage for controlling the current in said degaussing coil in sign and amount until said third voltage is substantially equal to said sum of first and second said voltages.

15. The method of degaussing a vessel equipped with M, F, and Q coils separately energized by direct current generators individual thereto which comprises passing through the M coil a current from one of said generators sufficient to substantially neutralize the vertical portion of the induced magnetic field of the vessel, stabilizing said current by tapping off from the energized M coil a fractional portion of the potential thereacross and subtracting the value of said fractional portion of potential from a reference potential, and employing the voltage difference therebetween for controlling the current from said one of said generators in direction and degree sufficient to restore said fractional portion of potential to equality with said reference potential.

16. The method of degaussing a vessel which comprises passing a current of sufficient magnitude to counteract the steady vertical portion of the normal magnetic field of the vessel through a coil substantially encircling the vessel in a horizontal plane, passing a second current through a horizontal coil encircling the forward portion of the vessel and through a horizontal coil encircling the after portion of the vessel in a direction opposite to the direction thereof in the forward coil the magnitude of said second current being just sufficient when the vessel is on a north and south heading to neutralize the portion of vertical field which varies with the heading of the vessel, and varying the current in said forward and after coils when the vessel is not on a north and south heading in proportion to the cosine of the instant angle of heading of the vessel relative to magnetic north.

17. The method of compensating a heading dependent component of the induced magnetic field of a vessel by variably energizing a degaussing coil on the vessel which comprises, measuring the angle of heading of the vessel relative to the magnetic north, establishing a voltage proportional to the cosine of said angle, establishing a second voltage of fixed magnitude and polarity, establishing a third voltage which varies in proportion to the instant current employed in the degaussing coil, measuring the difference between the sum of the first and second named voltages and the third voltage with regard to the sign of said voltage, amplifying said difference of voltage, and employing said amplified voltage for controlling the current in said degaussing coil in sign and amount until said third voltage is substantially equal to said sum of first and second said voltages.

18. The method of maintaining within close limits the degaussing current for a vessel equipped with an M coil and a direct current generator therefor which comprises, passing through the M coil a current from said generator sufficient to substantially neutralize the vertical portion of the induced field which is independent of the heading, tapping off from a portion of the M coil circuit a potential proportional to the instant value of the current therein, subtracting from said potential a predetermined reference potential for the instant locality of the vessel, and employing the instant difference of said potentials for adjusting a rheostat in series with a field winding of said generator for stabilization of the M coil current regardless of variations in the driving speed of the generator and variations in the exciting voltage therefor.

19. The method of compensating for the magnetic effects due to changing the heading of a degaussed vessel which comprises, energizing a first coil disposed horizontally about the forward portion of the vessel, energizing a second coil disposed horizontally about the after portion of the vessel, selecting a voltage from each said coil proportional to the instant current therein, respectively, providing a pair of voltages proportional to the cosine of the instant angle of heading of the vessel, subtracting the first of said selected voltages from one of said pair of voltages, subtracting the second of said selected voltages from the other of said pair of voltages, and energizing the field windings of said generators in direction and magnitude proportional respectively to said voltage differences whereby the current in each of said coils is varied according to the cosine of the instantaneous angle of heading of the vessel.

20. The method of compensating the magnetic field of a vessel equipped with coils for neutralizing heading dependent components of the field of the vessel comprising, energizing each said coil with a current proportional to a trigonometric function of the instant angle of heading of the vessel, and stabilizing each said current continuously at a value proportional thereto.

21. The method of claim 20 in which each coil is energized with a current proportional to said trigonometric function plus a constant which is proportional to a component of permanent magnetism of the vessel, and the current is stabilized at a value proportional thereto.

GILBERT J. PERLOW.
LYNN H. RUMBAUGH.

REFERENCES CITED

The following references are of record in the file of this patent:

UNITED STATES PATENTS

| Number | Name | Date |
| --- | --- | --- |
| 798,236 | Usener | Aug. 29, 1905 |
| 1,825,304 | Burnside | Sept. 29, 1931 |
| 2,239,768 | Artzt | Apr. 29, 1941 |
| 2,412,617 | Jenkins | Dec. 17, 1946 |
| 2,421,583 | Stuart | June 3, 1947 |
| 2,452,023 | Wild | Oct. 19, 1948 |